J. T. KELLY.
Steam-Generator.
No. 216,859. Patented June 24, 1879.
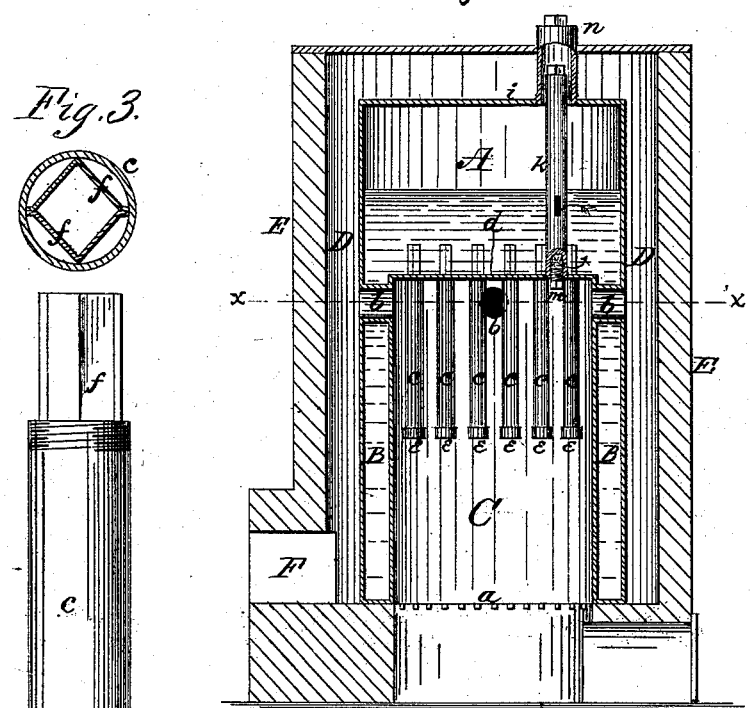
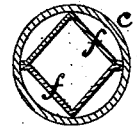
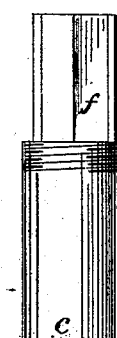
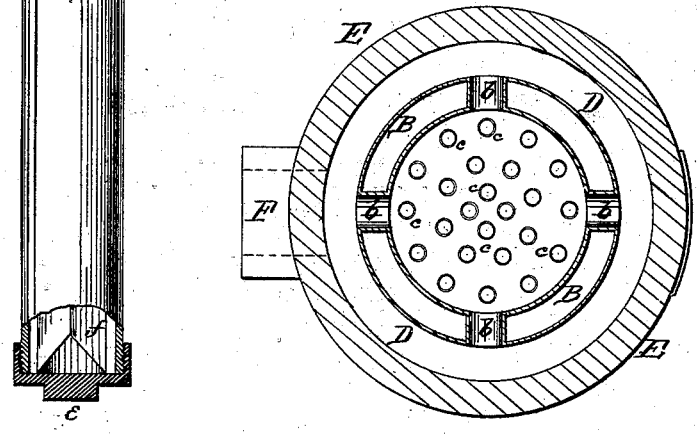

UNITED STATES PATENT OFFICE.

JOHN T. KELLY, OF PITTSBURG, PENNSYLVANIA.

IMPROVEMENT IN STEAM-GENERATORS.

Specification forming part of Letters Patent No. 216,859, dated June 24, 1879; application filed January 27, 1879.

*To all whom it may concern:*

Be it known that I, JOHN T. KELLY, of Pittsburg, in the county of Allegheny and State of Pennsylvania, have invented certain new and useful Improvements in Low-Pressure Steam-Generators; and I do hereby declare the following to be a full, clear, and exact description of the invention, such as will enable others skilled in the art to which it pertains to make and use it, reference being had to the accompanying drawings, which form part of this specification, in which—

Figure 1 is a vertical section; Fig. 2, a plan on line $x\ x$ of Fig. 1; and Fig. 3 is a detail.

This invention relates to low-pressure steam-generators, such as are used for supplying steam to heating devices; and consists in the construction and combination of parts, substantially as hereinafter fully described and claimed.

I am aware that "drop-tube" steam-generators are not new, broadly.

I am also aware that drop-tube generators have been made with a vertical annular water-leg inclosing and forming the fire-box; but they have been made with vertical flues passing up through the boiler, forming the only outlets for the smoke and flame. This causes great difficulties. The drop-tubes, occupying a large portion of the crown-sheet, leave but small spaces for the flues, which thus cannot be made large enough to afford sufficient passage for the products of combustion of soft coal. I obviate this difficulty by dispensing entirely with the vertical flues and substituting lateral flues through the water-leg, where no obstacles are present, and thus I can make the flues as large or as numerous as I find necessary.

A designates the boiler, having the annular vertical water-leg B, forming the fire-box C, having grate-bars $a$. Through the water-leg B, at or near its upper end, I construct a sufficient number of large lateral flue-openings, $b$. By this means I secure large flues, which will give plenty of draft, and will not clog up with soot and cinder, and, being out of the vertical line, will cause the flames to better circulate around the drop-tubes $c$. These drop-tubes consist of a plain iron tube threaded at both ends, having the upper end simply screwed into appropriate holes in the crown-sheet $d$ of the boiler, and having a cast-iron safety-cap, $e$, screwed to the lower end. Thus, if a cap burn off, it can be replaced without renewing the tube, as would be the case if the lower end of the tube were welded up.

Inside the tube $c$, I place loosely the sheet-metal strips $f f$, two or more, having edges bent to form meeting faces, so that when placed in the tube, as shown in Fig. 3, they divide the interior into a large inner space and several outer and smaller spaces, all running vertically, as shown. The upper ends of the strips $f$ project somewhat into the boiler. This effects a forced circulation, since the water which lies nearest the fire in the outer spaces naturally becomes heated and rises through them, and the cooler water falls in the inner portion. Communication is established by cutting the bottoms of the strips in V or other shape, as shown in Fig. 3.

The flues $b$ open into an annular flue-space, D, around the exterior of the boiler, and inclosed by the jacket or casing E, having the stack-opening F at the bottom, as shown.

By placing check-plates across the flue D at suitable points, the flames and heat may be made to completely circulate before passing to the stack.

I thus have secured great heating-surface, any desired flue-space, and economize the waste heat by the annular flue, and thus succeed in generating abundance of steam with a low fire, and can use any class of coal without fear of clogging the flues.

To use these boilers some safety appliance is always demanded, which I construct as follows: I cut two holes—one in the top sheet, $i$, and the other in the crown-sheet $d$, both in line vertically, but the upper one larger than the lower. A pipe, $k$, having a fusible plug, $m$, screwed into its lower end, and threaded to fit the hole in crown-sheet $d$, is passed down through the opening in the top sheet and screwed into the hole in crown-sheet. Pipe $k$ extends up slightly through the top sheet to afford room for griping it with a tongs, and is perforated near the water-line and near or at the bottom to allow circulation of water in its interior. A cap-tube, $n$, is then screwed down into top sheet, and is made of such length as to permit the expansion of pipe $k$ freely.

Thus arranged, if the plug $m$ melts, the water at once floods and extinguishes the fire and prevents explosion. To put in a new plug I simply remove cap $n$, pipe $k$, and the melted plug, place a new one instead, and return the pipe and cap to position, and all this without waiting for the fire to cool, since the parts are accessible from the top.

I claim as my invention—

The steam-generator consisting of the following elements in combination: boiler A, its described water-leg B, inclosing fire-chamber C, drop-tubes $c$, having interior strips, $f$, lateral flues $b$ in said water-leg, annular exterior flue, D, extending down to the end of said water-leg, casing or jacket E, and stack-flue F, located below flues $b$, all arranged and operating substantially as described.

In testimony that I claim the foregoing I have hereunto set my hand this 18th day of January, 1879.

JOHN T. KELLY.

Witnesses:
GEORGE M. JONES,
JAS. H. JOHNSTON.